(12) United States Patent
Nakatani

(10) Patent No.: US 9,891,871 B2
(45) Date of Patent: Feb. 13, 2018

(54) IMAGE PROCESSING APPARATUS FOR PRINT JOB DATA IN PDL FORMAT

(71) Applicant: RISO KAGAKU CORPORATION, Tokyo (JP)

(72) Inventor: Nobuya Nakatani, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/430,930

(22) Filed: Feb. 13, 2017

(65) Prior Publication Data

US 2017/0249109 A1 Aug. 31, 2017

(30) Foreign Application Priority Data

Feb. 26, 2016 (JP) .................................. 2016-035517

(51) Int. Cl.
*G06F 3/12* (2006.01)

(52) U.S. Cl.
CPC .......... *G06F 3/1212* (2013.01); *G06F 3/1205* (2013.01); *G06F 3/1227* (2013.01); *G06F 3/1248* (2013.01); *G06F 3/1256* (2013.01); *G06F 3/1285* (2013.01)

(58) Field of Classification Search
USPC ....................................................... 358/1.15
See application file for complete search history.

(56) References Cited

U.S. PATENT DOCUMENTS

| 2005/0128502 A1* | 6/2005 | Yamashita | G06K 15/00 358/1.13 |
| 2016/0188272 A1* | 6/2016 | Sakata | G06F 3/121 358/1.15 |

FOREIGN PATENT DOCUMENTS

JP 2009-37539 2/2009

\* cited by examiner

*Primary Examiner* — Ngon Nguyen
(74) *Attorney, Agent, or Firm* — Greenblum & Bernstein, P.L.C.

(57) ABSTRACT

An image processing apparatus includes a processor and a memory including instructions. The instructions, when executed by a processor, cause the processor to perform operations including: receiving a print job data in a PDL format from an external apparatus; determining whether a Generator of the print job data satisfies a guarantee condition guaranteeing compatibility with the image processing apparatus; upon determining that the generator of the print job data does not satisfy the guarantee condition, executing a preflight processing of checking a syntax of the print job data and then developing the print job data subjected to the preflight processing into an image data; and upon determining that the generator of the print job data satisfies the guarantee condition, skipping the preflight processing and then developing the print job data not subjected to the preflight processing into an image data.

7 Claims, 3 Drawing Sheets

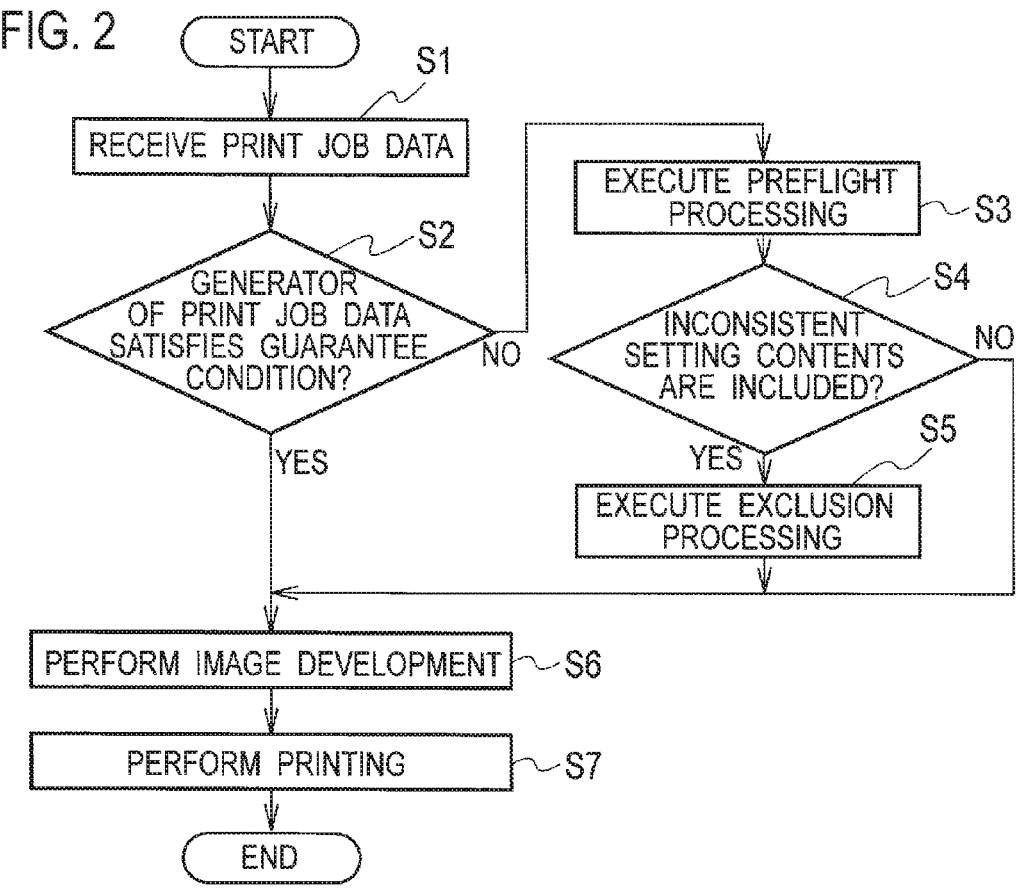
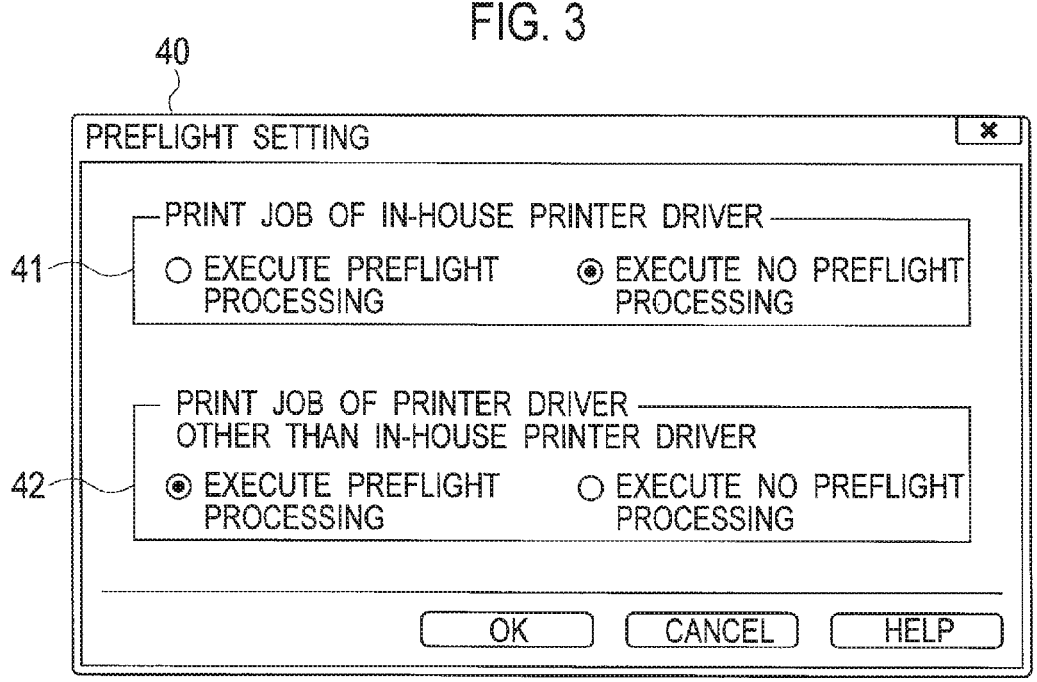

IMAGE PROCESSING APPARATUS FOR PRINT JOB DATA IN PDL FORMAT

CROSS REFERENCE TO RELATED APPLICATION

This application is based upon and claims the benefit of priority from the prior Japanese Patent Application No. 2016-035517, filed on Feb. 26, 2016, the entire contents of which are incorporated herein by reference.

BACKGROUND

1. Technical Field

The disclosure relates to an image processing apparatus which generates image data by processing print job data in a page description language (PDL) format.

2. Related Art

Japanese Unexamined Patent Application Publication No. 2009-37539 discloses that in a print apparatus that receives print job data described in a general PDL such as PostScript, an image processing apparatus executes preflight processing on the print job data.

The preflight processing is processing of checking whether there is an error in the syntax of the print job data. The preflight processing checks whether the print apparatus can execute the printing without any trouble. After the preflight processing, the image processing apparatus performs processing of developing the print job data into image data. Thereafter, the print apparatus performs printing based on the image data.

SUMMARY

When the preflight processing is executed for all pieces of print job data received by the print apparatus, the preflight processing is executed also for print job data for which the necessity of the preflight processing is low, and this increases the processing time of the print job data.

An object of the present invention is to provide an image processing apparatus which can reduce the processing time of the print job data.

An image processing apparatus in accordance with some embodiments includes: a processor; and a memory including instructions that, when executed by the processor, cause the processor to perform operations. The operations include: receiving a print job data in a PDL format from an external apparatus; determining whether a generator of the print job data satisfies a guarantee condition guaranteeing compatibility with the image processing apparatus; upon determining that the generator of the print job data does not satisfy the guarantee condition, executing a preflight processing of checking a syntax of the print job data and then developing the print job data subjected to the preflight processing into an image data; and upon determining that the generator of the print job data satisfies the guarantee condition, skipping the preflight processing and then developing the print job data not subjected to the preflight processing into an image data.

In the configuration described above, the preflight processor skips the preflight processing when the generator of the print job data satisfies the guarantee condition. The preflight processing for the print job data for which the necessity of preflight processing is low is thereby skipped. As a result, the processing time of the print job data can be reduced.

The operations may include: upon an instruction to skip the preflight processing being given by a user, skipping the preflight processing; and upon no instruction to skip the preflight processing being given by the user, executing the preflight processing.

In the configuration described above, a preflight processor can select whether to skip the preflight processing or not depending on the instruction of the user. Hence, it is possible to respond to a demand of a user who desires to select whether to execute the preflight processing or not. As a result, convenience of the user is improved.

The operations may include: determining whether inconsistent setting contents are included in print setting contents in the print job data; upon determining that the generator of the print job data does not satisfy the guarantee condition and that the inconsistent setting contents are included in the print setting contents, executing an exclusion processing of resolving inconsistency between the inconsistent setting contents; upon determining that the generator of the print job data does not satisfy the guarantee condition and that no inconsistent setting contents are included in the print setting contents, skipping the exclusion processing; and upon determining that the generator of the print job data satisfies the guarantee condition, skipping the exclusion processing.

In the configuration described above, an exclusion processor skips the exclusion processing when the generator of the print job data satisfies the guarantee condition. The exclusion processing for the print job data for which the necessity of the exclusion processing is low is thereby skipped. As a result, the processing time of the print job data can be further reduced.

BRIEF DESCRIPTION OF DRAWINGS

FIG. 2 is a flowchart for explaining operations of a print apparatus in the first embodiment.

FIG. 3 is a view illustrating a preflight setting screen.

DETAILED DESCRIPTION

Figure 1:
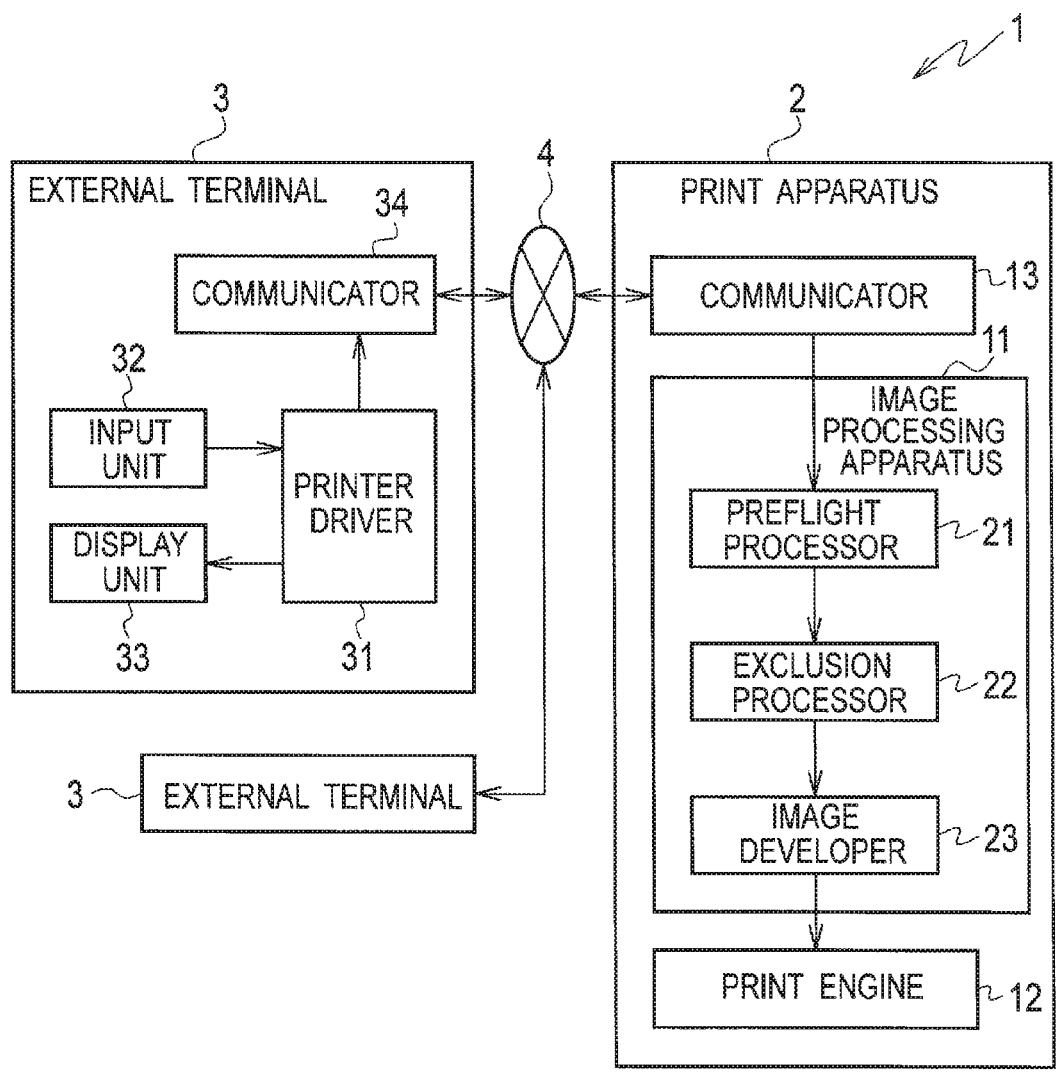
FIG. 1 is a block diagram illustrating a configuration of a print system in a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Embodiments of the present invention are described below with reference to the drawings.

First Embodiment

FIG. 1 is a block diagram illustrating a configuration of a print system 1 including a print apparatus 2 provided with an image processing apparatus 11 in a first embodiment of the present invention.

As illustrated in FIG. 1, the print system 1 includes the print apparatus 2 and external terminals 3. The print apparatus 2 and the external terminals 3 are communicably connected to each other via a network 4. The network 4 includes, for example, a local area network (LAN).

The print apparatus 2 performs printing based on a print job data in a PDL format which is sent from the external terminals 3. The print apparatus 2 includes the image processing apparatus 11, a print engine 12, and a communicator 13.

The image processing apparatus 11 generates image data by processing the print job data. The image processing apparatus 11 includes a preflight processor 21, an exclusion processor 22, and an image developer 23. Note that, the preflight processor 21, the exclusion processor 22, and the image developer 23 may be implemented as functional modules by a CPU, a memory, a hard disk, a storage formed of a semiconductor memory, and the like included in the print apparatus 2. The storage stores instructions that, when executed by a processor of the CPU, cause the processor to perform operations explained below.

The preflight processor 21 executes preflight processing of checking the syntax of the print job data in the PDL format sent from the external terminal 3.

Moreover, the preflight processor 21 determines whether a generator of the print job data satisfies a guarantee condition guaranteeing compatibility with the image processing apparatus 11 (print apparatus 2), based on generator information included in a header portion of the print job data. The guarantee condition is specifically a condition where a printer driver being the generator of the print job data is an in-house printer driver for the image processing apparatus 11 (print apparatus 2). The in-house printer driver is a printer driver created by the manufacturer of the image processing apparatus 11 (print apparatus 2) and guaranteed of compatibility with the image processing apparatus 11 (print apparatus 2). When the generator of the print job data satisfies the guarantee condition, that is, when the generator of the print job data is the in-house printer driver, the preflight processor 21 skips the preflight processing.

The exclusion processor 22 executes exclusion processing on the print job data. The exclusion processing is processing of: checking whether inconsistent setting contents are included in print setting contents of the print job data, based on print setting information included in the header portion of the print job data; and when inconsistent setting contents are included, resolving the inconsistency. The case where inconsistent setting contents are included in the print setting contents is a case where, for example, a print setting for creating a booklet by performing duplex printing and a simplex print setting are included.

When the generator of the print job data satisfies the guarantee condition, that is, when the generator of the print job data is the in-house printer driver, the exclusion processing is skipped.

The image developer 23 performs image development on the print job data and generates bitmap image data. When the preflight processing is executed by the preflight processor 21, the image developer 23 develops the print job data into the image data after the preflight processing. Meanwhile, when the preflight processing by the preflight processor 21 is skipped, the image developer 23 develops the print job data not subjected to the preflight processing into the image data.

The print engine 12 prints an image on a sheet based on the image data generated by the image developer 23. The print engine 12 has a print mechanism of an inkjet method, a stencil printing method, or the like.

The communicator 13 connects the print apparatus 2 to the network 4. The print apparatus 2 can thereby communicate with external apparatuses such as the external terminals 3.

Each of the external terminals 3 generates the print job data in the PDT, format and sends the print job data to the print apparatus 2. At least one external terminal 3 is included in the print system 1. The external terminal 3 is, for example, a personal computer. The external terminal 3 includes a printer driver 31, an input unit 32, a display unit 33, and a communicator 34.

The printer driver 31 generates the print data in the PDL format for printing image data generated by a not-illustrated application. A CPU included in the external terminal 3 executes a printer driver program to implement the printer driver 31. Note that the printer driver 31 of each external terminal 3 may not be the in-house printer driver for the image processing apparatus 11 (print apparatus 2).

The input unit 32 receives various instructions given by the user and information input operations performed by the user. The input unit 32 includes a keyboard, a mouse, and the like.

The display unit 33 displays various input screens and the like. The display unit 33 includes a liquid crystal display and the like.

The communicator 34 connects the external terminal 3 to the network 4. The external terminal 3 can thereby communicate with external apparatuses such as the print apparatus 2.

Next, operations of the print system 1 are described.

When the printing is to be performed in the print apparatus 2 of the print system 1, the user operates the input unit 32 in the external terminal 3 to cause the external terminal 3 to display a printer driver screen on the display unit 33 and to also input the print setting contents and give a print start instruction in the printer driver screen.

When the user gives the print start instruction by operating the input unit 32, the printer driver 31 generates the print job data in the PDL format. Then, the printer driver 31 sends the generated print job data to the print apparatus 2 via the communicator 34.

The print job data includes the header portion and a processing portion of each of pages. The header portion includes generator information of the print job data. The generator information is information on the printer driver 31 being the generator of the print job data and includes information indicating the manufacturer of the printer driver 31. Moreover, the header portion includes the print setting information. The print setting information includes the various print setting contents inputted in the printer driver screen. The processing portion of each page defines an analysis instruction and a rasterization instruction of the page.

The print apparatus 2 receives the print job data from the external terminal 3 and executes the printing. Operations of the print apparatus 2 in this case are described with reference to the flowchart of FIG. 2.

In step S1 of FIG. 2, the communicator 13 of the print apparatus 2 receives the print job data from the external terminal 3 via the network 4.

Next, in step S2, the preflight processor 21 obtains the print job data from the communicator 13 and determines whether the generator of the print job data satisfies the guarantee condition, based on the generator information included in the header portion of the print job data. Specifically, the preflight processor 21 determines whether the printer driver 31 being the generator of the print job data is the in-house printer driver for the image processing apparatus 11 (print apparatus 2), based on the generator information. When the printer driver 31 being the generator of the print job data is the in-house printer driver, the preflight processor 21 determines that the generator of the print job data satisfies the guarantee condition.

When the preflight processor 21 determines that the generator of the print job data does not satisfy the guarantee condition (step S2: NO), in step S3, the preflight processor 21 executes the preflight processing on the print job data. Specifically, the preflight processor 21 checks whether there is no error in the syntax of the print job data.

Next, in step S4, the exclusion processor 22 determines whether to execute the exclusion processing on the print job data or not. When the exclusion processor 22 determines to execute the exclusion processing on the print job data (step S4: YES), in step S5, the exclusion processor 22 executes the exclusion processing on the print job data. Meanwhile, when the exclusion processor 22 determines to execute no exclusion processing on the print job data (step S4: NO), the exclusion processing of step S4 is skipped and the processing proceeds to step S6.

Specifically, in step S4, the exclusion processor 22 determines whether inconsistent setting contents are included in the print setting contents in the print job data, based on the print setting information included in the header portion of the print job data. Note that the exclusion processor 22 refers to the processing portion of each page in the print job data as necessary and determines whether there are inconsistent setting contents.

Then, when inconsistent setting contents are included in the print setting contents (step S4: YES), the exclusion processor 22 changes the settings based on the order of priority set in advance for each setting, such that the inconsistency is resolved (step S5). For example, when the print setting contents include the print setting for creating a booklet by performing duplex printing and the simplex print setting and the print setting for creating a booklet has a higher order of priority than the simplex print setting, the exclusion processor 22 cancels the simplex print setting.

When the exclusion processing of step S5 is completed, the processing proceeds to step S6.

In step S2, when the preflight processor 21 determines that the generator of the print job data satisfies the guarantee condition (step S2: YES), steps S3, S4, and S5 are skipped and the processing proceeds to step S6.

When the printer driver 31 being the generator of the print job data is the in-house printer driver, a possibility that an error for the print apparatus 2 is included in the syntax of the print job data is low. Accordingly, the necessity of the preflight processing is low in this situation, and the preflight processing of step S3 is thus skipped.

Moreover, when the printer driver 31 being the generator of the print job data is the in-house printer driver, it is impossible to set inconsistent contents for the print apparatus 2 in the print setting in the printer driver 31. Accordingly, the necessity of the exclusion processing is low in this situation, and the exclusion processing of S5 is thus skipped.

In step S6, the image developer 23 generates the bitmap image data by performing image development on the print job data.

Next, in step S7, the print engine 12 prints the image on the sheet based on the image data generated by the image developer 23. The series of operations is thereby completed.

As described above, in the image processing apparatus 11, the preflight processor 21 skips the preflight processing when the generator of the print job data satisfies the guarantee condition. The preflight processing for the print job data for which the necessity of the preflight processing is low is thereby skipped. As a result, the image processing apparatus 11 can reduce the processing time of the print job data.

Moreover, in the image processing apparatus 11, the exclusion processor 22 skips the exclusion processing when the generator of the print job data satisfies the guarantee condition. The exclusion processing for the print job data for which the necessity of the exclusion processing is low is thereby skipped. As a result, the image processing apparatus 11 can further reduce the processing time of the print job data.

Second Embodiment

Description is given of a second embodiment in which the processing of the preflight processor 21 in the aforementioned embodiment is changed.

In the second embodiment, the preflight processor 21 can select whether to skip the preflight processing or not, depending on an instruction of the user.

The user can give the instruction on whether to skip the preflight processing or not by operating the external terminal 3.

Specifically, when the user performs an operation of selecting a preflight setting in the input of the print setting contents in the printer driver screen displayed on the display unit 33 of the external terminal 3, a preflight setting screen 40 as illustrated in FIG. 3 is displayed.

The preflight setting screen 40 is provided with a first input field 41 and a second input field 42. The first input field 41 is a portion which receives input of selection on whether to execute or skip the preflight processing when the generator of the print job data satisfies the guarantee condition, that is, when the generator of the print job data is the in-house printer driver. The second input field 42 is a portion which receives input of selection on whether to execute or skip the preflight processing when the generator of the print job data does not satisfy the guarantee condition, that is, when the generator of the print job data is a printer driver other than the in-house printer driver.

The printer driver 31 generates the print job data by including, in the print setting information of the header portion, a content of the preflight setting which is set in the preflight setting screen 40 and which indicates the instruction on whether to skip the preflight processing or not.

Next, operations of the print apparatus 2 in the second embodiment are described with reference to the flowchart of FIG. 4.

Figure 4:
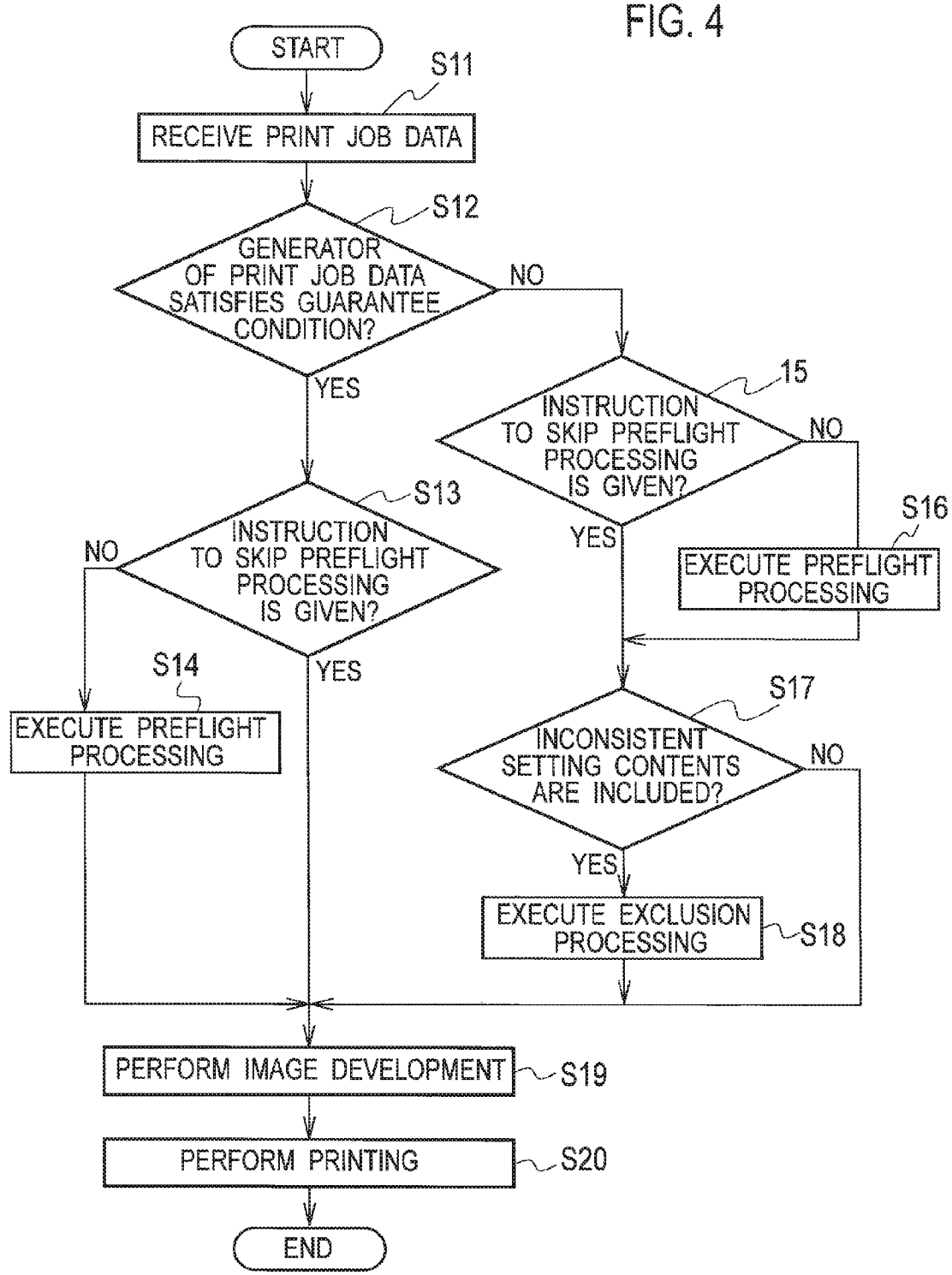
FIG. 4 is a flowchart for explaining operations of a print apparatus in a second embodiment.

The processing of steps S11 and S12 of FIG. 4 is the same as the aforementioned processing of steps S1 and S2 of FIG. 2.

When the preflight processor 21 determines in step S12 that the generator of the print job data satisfies the guarantee condition (step S12: YES), in step S13, the preflight processor 21 determines whether the instruction to skip the preflight processing when the generator of the print job data satisfies the guarantee condition is given or not, based on the print setting information of the print job data.

When the preflight processor 21 determines that no instruction to skip the preflight processing is given, that is; the instruction to execute the preflight processing is given (step S13: NO), in step S14, the preflight processor 21 executes the preflight processing. Thereafter, the processing proceeds to step S19.

When the preflight processor 21 determines that the instruction to skip the preflight processing is given (step S13: YES), the preflight processor 21 skips step S14 and the processing proceeds to step S19.

When the preflight processor 21 determines in step S12 that the generator of the print job data does not satisfy the guarantee condition (step S12: NO), in step S15, the preflight processor 21 determines whether the instruction to skip the preflight processing when the generator of the print job data does not satisfy the guarantee condition is given or not, based on the print setting information of the print job data.

When the preflight processor 21 determines that no instruction to skip the preflight processing is given, that is, the instruction to execute the preflight processing is given (step S15: NO), in step S16, the preflight processor 21 executes the preflight processing. Thereafter, the processing proceeds to step S17.

When the preflight processor 21 determines that the instruction to skip the preflight processing is given (step S15: YES), the preflight processor 21 skips step S16 and the processing proceeds to step S17.

The processing from steps S17 to S20 is the same as the aforementioned processing from step S4 to S7 of FIG. 2. When step S20 is completed, the series of operations is completed.

As described above, in the second embodiment, the preflight processor 21 can select whether to skip the preflight processing or not depending on the instruction of the user. The printing system can thereby respond to a demand of a user who desires to select whether to execute the preflight processing or not. As a result, convenience of the user is improved.

Other Embodiments

The present invention has been described above by using the first and second embodiments. However, it should not be understood that the descriptions and drawings forming part of the disclosure limit the present invention. From this disclosure, various alternative embodiments, examples, and operation techniques will be found by those skilled in the art.

In the first and second embodiments described above, the guarantee condition is the condition where the printer driver being the generator of the print job data is the in-house printer driver for the image processing apparatus 11 (print apparatus 2), but the guarantee condition is not limited to this condition. For example, the guarantee condition may be a condition where the printer driver is a printer driver out of the in-house printer drivers whose version is guaranteed of compatibility with the image processing apparatus 11 (print apparatus 2). Moreover, the guarantee condition may be a condition where the printer driver is any of printer drivers guaranteed of compatibility with the image processing apparatus 11 (print apparatus 2) including printer drivers other than the in-house printer drivers. In this case, the printer driver being guaranteed of compatibility with the image processing apparatus 11 (print apparatus 2) means that print job data generated by this printer driver is evaluated to be capable of being processed by the image processing apparatus 11 and printed without trouble in the print apparatus 2.

Skipping or executing the exclusion processing by the exclusion processor 22 can be also selected depending on an instruction of the user, as in the case of the preflight processing in the second embodiment.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Moreover, the effects described in the embodiments of the present invention are only a list of optimum effects achieved bar the present invention. Hence, the effects of the present invention are not limited to those described in the embodiment of the present invention.

What is claimed is:

1. An image processing apparatus comprising:
   a processor; and
   a memory including instructions that, when executed by the processor, cause the processor to perform operations including:
   receiving a print job data in a page description language format generated from a printer driver of an external apparatus;
   determining whether the printer driver generating the print job data satisfies a guarantee condition guaranteeing compatibility of the printer driver with the image processing apparatus;
   upon determining that the printer driver generating the print job data does not satisfy the guarantee condition, executing a preflight processing of checking a syntax of the print job data and then developing the print job data subjected to the preflight processing into an image data for printing; and
   upon determining that the printer driver generating the print job data is a specialized printer driver that satisfies the guarantee condition, skipping the preflight processing and then developing the print job data not subjected to the preflight processing into an image data for printing.

2. The image processing apparatus according to claim 1, wherein the operations include:
   upon an instruction to skip the preflight processing being given by a user, skipping the preflight processing; and
   upon no instruction to skip the preflight processing being given by the user, executing the preflight processing.

3. The image processing apparatus according to claim 2, wherein the operations include:
   determining whether inconsistent setting contents are included in print setting contents in the print job data;
   upon determining that the printer driver generating the print job data does not satisfy the guarantee condition and that the inconsistent setting contents are included in the print setting contents, executing an exclusion processing of resolving inconsistency between the inconsistent setting contents;
   upon determining that the printer driver generating the print job data does not satisfy the guarantee condition and that no inconsistent setting contents are included in the print setting contents, skipping the exclusion processing; and
   upon determining that the printer driver generating the print job data is the specialized printer driver that satisfies the guarantee condition, skipping the exclusion processing.

4. The image processing apparatus according to claim 1, wherein the operations include:
- determining whether inconsistent setting contents are included in print setting contents in the print job data;
- upon determining that the printer driver generating the print job data does not satisfy the guarantee condition and that the inconsistent setting contents are included in the print setting contents, executing an exclusion processing of resolving inconsistency between the inconsistent setting contents;
- upon determining that the printer driver generating the print job data does not satisfy the guarantee condition and that no inconsistent setting contents are included in the print setting contents, skipping the exclusion processing; and
- upon determining that the printer driver generating the print job data is the specialized printer driver that satisfies the guarantee condition, skipping the exclusion processing.

5. The image processing apparatus according to claim 1, wherein
the specialized printer driver is one of an in-house printer driver or other non-generic printer driver that guarantees compatibility with the image processing apparatus such that the specialized printer driver communicates specialized print job data to the processor that is evaluated to be compatible with the image processing apparatus.

6. The image processing apparatus according to claim 1, wherein
when the printer driver is the specialized printer driver, the print job data includes specialized printer driver information including information indicating a manufacturer of the specialized printer driver.

7. The image processing apparatus according to claim 6, wherein
the guarantee condition is based on the specialized printer driver information.

* * * * *